United States Patent
Inoguchi et al.

(10) Patent No.: US 7,240,872 B2
(45) Date of Patent: Jul. 10, 2007

(54) GUIDE ROLLER INCLUDING A PAIR OF BEARING HAVING BEARINGS FLANGES FOR RETAINING A PAIR OF FIRM DISK-SHAPED ANNULAR FLANGES

(75) Inventors: Hiromi Inoguchi, Kanagawa (JP); Nobutaka Tsuneyoshi, Kanagawa (JP); Kouji Kobayashi, Kanagawa (JP); Naoki Tatsumi, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/342,423

(22) Filed: Jan. 30, 2006

(65) Prior Publication Data

US 2006/0231661 A1   Oct. 19, 2006

(30) Foreign Application Priority Data

Mar. 28, 2005   (JP)   ............... 2005-091546

(51) Int. Cl.
*G11B 23/04*   (2006.01)
(52) U.S. Cl. ................. 242/346.2; 242/615.2
(58) Field of Classification Search ............... 242/346, 242/346.2, 615, 615.2, 548, 548.2, 566; 226/189, 226/190, 194, 196.1; 360/130.21
See application file for complete search history.

(56) References Cited

U.S. PATENT DOCUMENTS

| 1,854,004 A | * | 4/1932 | Tschopp ............... 226/194 |
| 3,087,665 A | * | 4/1963 | Thomas ............... 226/190 |
| 3,276,651 A | * | 10/1966 | Bryer ............... 242/615.2 |
| 5,407,117 A | * | 4/1995 | Yokoo et al. ............... 226/190 |
| 6,141,184 A | * | 10/2000 | Daly ............... 360/130.21 |
| 6,322,014 B1 | | 11/2001 | Nemeth |
| 6,634,535 B2 | | 10/2003 | Tatsumi et al. |
| 2004/0222327 A1 | | 11/2004 | Hanscom |

FOREIGN PATENT DOCUMENTS

JP   9-22067 A   1/1997

\* cited by examiner

*Primary Examiner*—William A. Rivera
(74) *Attorney, Agent, or Firm*—Frishauf, Holtz, Goodman & Chick, P.C.

(57) ABSTRACT

A pair of disk-shaped annular flanges is made of material firmer than that of a hollow cylindrical-shaped roller portion. The roller portion has an outer peripheral surface in which the flanges are mounted at opposite ends thereof. On press-fitting a pair of bearings in the roller portion, the flanges are retained by means of bearing flanges. The outer peripheral surface of the roller portion has a pair of flange guides, at opposite ends thereof, for guiding the flanges. The flange guide has a longitudinal length shorter than thickness of the flange. An adhesive agent may be filled in a gap formed among an end surface of the roller portion, the disk-shaped annular flange, and the bearing.

10 Claims, 4 Drawing Sheets

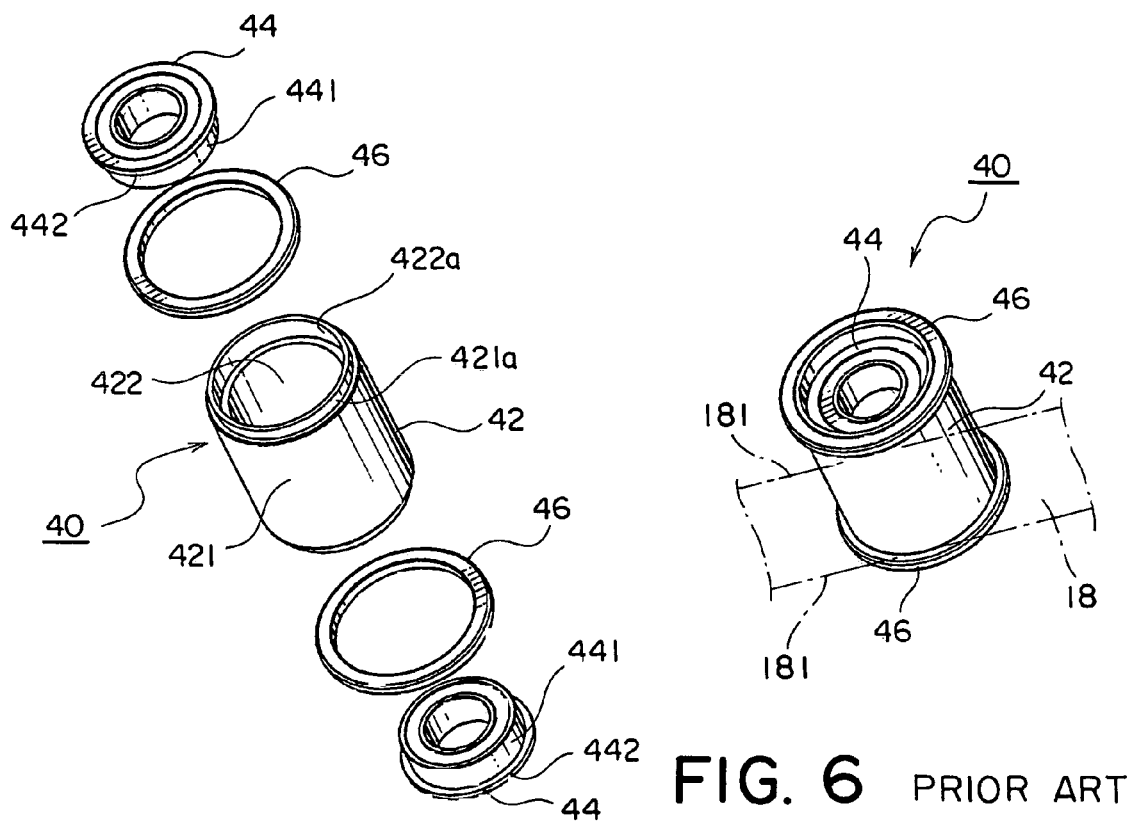
FIG. 5 PRIOR ART
FIG. 6 PRIOR ART
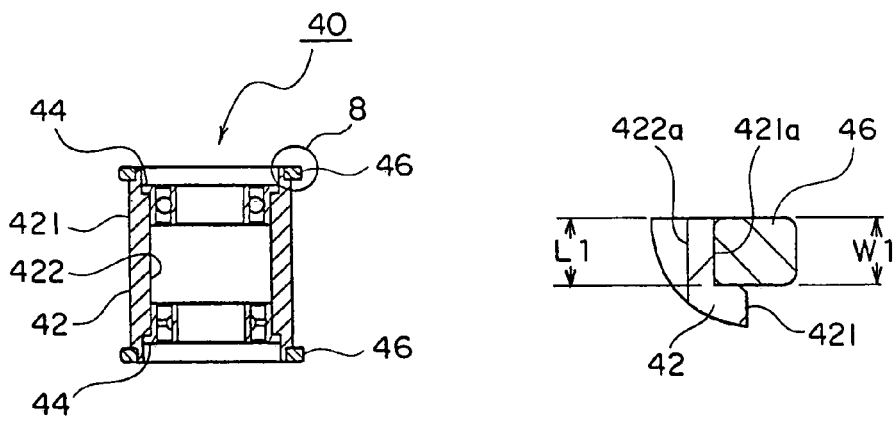
FIG. 7 PRIOR ART
FIG. 8 PRIOR ART

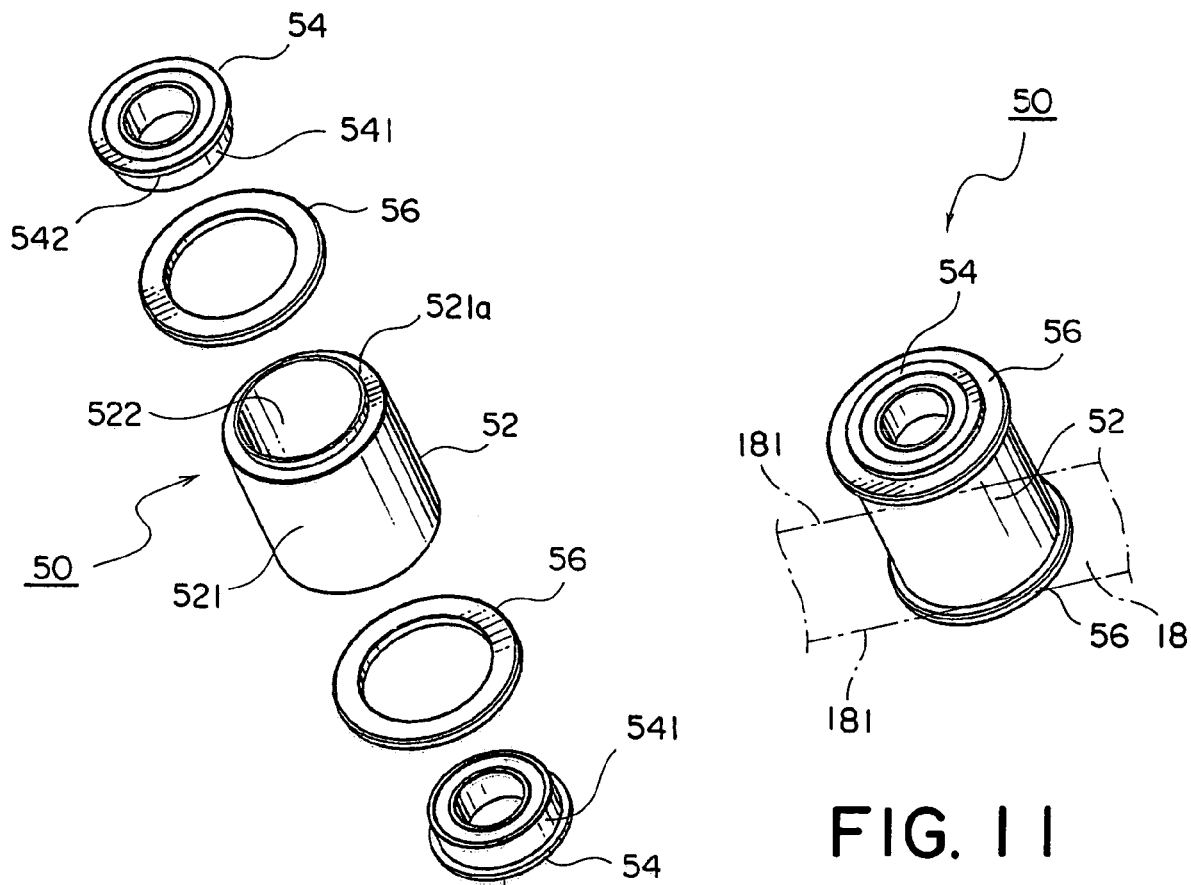
FIG. 10
FIG. 11
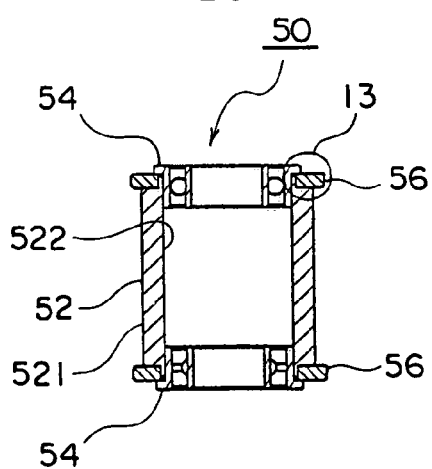
FIG. 12
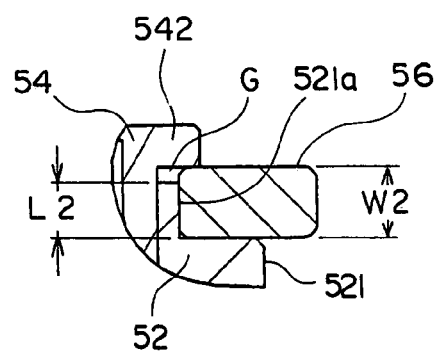
FIG. 13

GUIDE ROLLER INCLUDING A PAIR OF BEARING HAVING BEARINGS FLANGES FOR RETAINING A PAIR OF FIRM DISK-SHAPED ANNULAR FLANGES

This application claims priority to prior Japanese Patent Application JP 2005-91546, the disclosure of which is incorporated herein by reference.

BACKGROUND OF THE INVENTION

This invention relates to a recording and/or reproducing device represented by DLT (digital linear tape) or LTO (linear tape open) and, in particular, to a guide roller for guiding a tape and a method of manufacturing it.

Recording and/or reproducing devices of the type described are developed for use in back-up ones of computer systems and various types of the recording and/or reproducing devices have been proposed in prior art. Such a recording and/or reproducing device serving as the LTO is disclosed, for example, in U.S. Pat. No. 6,322,014 issued to Robert Nemeth.

The recording and/or reproducing device may be also a tape drive in which a cartridge having a single reel (a supply reel) can be installed. The cartridge may be also called a cassette. The recording and/or reproducing device contains a take-up reel therein. When the cartridge is installed in the recording and/or reproducing device, a magnetic tape (which will be also referred to "tape" merely) is pulled out of the cartridge and then is wound by the take-up reel through a guide assembly. The guide assembly is for guiding the tape pulled out of the cartridge in a magnetic head. The guide assembly comprises a plurality of guide rollers each of which uses bearings. The magnetic head exchanges information between the tape and the magnetic head. In addition, the take-up reel is rotationally drivable by means of a real motor.

In the manner which is described above, provided in the tape drive, the guide roller is guiding the tape pulled out of the cartridge in the magnetic head. The guide roller is rotatably supported on a roller shaft mounted on a chassis of the tape drive. The roller shaft includes a shaft portion of a substantially solid cylindrical shape. Such a roller shaft is disclosed, for example, in U.S. Pat. No. 6,634,535 issued to Naoki Tatsumi et al.

More specifically, the guide roller includes a roller portion and a pair of bearings for rotatably supporting the roller portion on the shaft portion of the roller shaft. Such a guide roller is disclosed, for example, in United States Patent Application Publication No. 2004/0222327 A1. The guide roller is called a first conventional guide roller. The first conventional guide roller will later be described in detail in conjunction with FIGS. 1 through 4.

A different guide roller is disclosed, for example, in Japanese Unexamined Patent Application Publication No. Hei 9-22067 or JP-A 9-22067. In the different guide roller disclosed in JP-A 9-22067, a cylindrical-shaped roller portion and a pair of disk-shaped annular flanges are separately constituted and the pair of disk-shaped annular flanges is fitted in an outer surface of the cylindrical-shaped roller portion at opposite end sides. JP-A 9-22067 also discloses the guide roller in which each flange is made of material having hardness firmer than that of the roller portion. The guide roller is called a second conventional guide roller. The second conventional guide roller will also later be described in detail in conjunction with FIGS. 5 to 8.

Incidentally, in the tape drive, as methods of realizing a large capacity, the following methods are adopted: to increase head channels, to lengthen the tape by thinning a thickness of the tape to be used, to increase a transport rate by becoming fast a tape traveling speed, or the like. However, to thin the thickness of the tape and to increase the tape traveling speed are disadvantageous in that both edges of the tape mar the flanges of the guide roller. It results in adversely affect traveling of the tape.

In order to resolve such problems, it is carried out by coating, with a material having high hardness such as titanium, ceramics, DLC (diamond-like carbon), or the like, a surface of the roller portion in the first conventional guide roller or a surface of the flanges in the second conventional guide roller. However, to apply the above-mentioned particular coating to the surface is disadvantageous in that the guide roller increases in cost.

Particularly, in a case where the roller flanges are integrally formed in the roller portion as the first conventional guide roller, the particular coating further increases in cost because the coating is applied to all of the surface of the roller portion.

On the other hand, in order to resolve the above-mentioned problems, it may be considered that only the flanges are made of a material firmer than that of the roller portion in the second conventional guide roller. However, another problem may be encountered in making the flanges of the firm material. This is because the flanges crack on press-fitting the pair of flanges in a pair of outer peripheral step parts at the both ends of a roller outer peripheral surface of the roller portion. In order to resolve the problem on press-fitting the flanges, it may be considered that it is designed so that the diameter of the outer peripheral step part is substantially equal to the inner diameter of the flange and the pair of flanges is coupled by means of an adhesive agent with the outer peripheral step parts at both sides of the roller outer peripheral surface of the roller portion. However, with the structure of the second conventional guide roller, it is disadvantageous in that the adhesive agent leaks on the roller outer peripheral surface of the roller portion.

SUMMARY OF THE INVENTION

It is therefore an object of the present invention to provide a guide roller and a method of manufacturing the same, which are capable of preventing edges of a tape from marring flanges without applying a particular coating.

It is another object of the present invention to provide a guide roller and a method of manufacturing the same, which are capable of attaching the flanges to a roller portion without press-fitting the flanges in the roller portion.

It is still another object of the present invention to a guide roller and a method of manufacturing the same, in which an adhesive agent is not leaked out the outside although the adhesive agent is used.

Other objects of this invention will become clear as the description proceeds.

On describing the gist of a first aspect of this invention, it is possible to be understood that a guide roller is for guiding a tape having both edges at opposite ends thereof. The guide roller comprises a hollow cylindrical-shaped roller portion for guiding traveling of the tape, a pair of disk-shaped annular flanges, disposed at opposite ends of the roller portion, for controlling positions of the both edges of the tape, and a pair of bearings for rotatably supporting the roller portion. According to the first aspect of this invention, each of the bearings has a bearing flange at one end thereof.

The pair of disk-shaped annular flanges is made of material firmer than that of the hollow cylindrical-shaped roller portion. The disk-shaped annular flanges are mounted on an outer peripheral surface of the hollow cylindrical-shaped roller portion at opposite ends thereof. The disk-shaped annular flanges are retained by the bearing flanges on press-fitting the of bearings in the hollow cylindrical-shaped roller portion.

In the above-mentioned guide roller, the outer peripheral surface of the hollow cylindrical-shaped roller portion preferably may have a pair of flange guides, at opposite ends thereof, for guiding the pair of disk-shaped annular flanges. Each of the flange guides may have a longitudinal length which is shorter than a thickness of the disk-shaped annular flange. In addition, a gap may be formed among an end surface of the hollow cylindrical-shaped roller portion, the disk-shaped annular flange, and the bearing. In this event, an adhesive agent desirably may be filled in the gap. The pair of disk-shaped annular flanges preferably may be, for example, made of a material selected from the group consisting of zirconia, ceramic, sapphire, emerald, diamond.

On describing the gist of a second aspect of this invention, it is possible to be understood that a recording and/or reproducing device includes a guide assembly comprising a plurality of guide rollers each of which guides a tape having both edges at opposite ends thereof. According to the second aspect of this invention, each of the guide rollers comprises a hollow cylindrical-shaped roller portion for guiding traveling of the tape, a pair of disk-shaped annular flanges, disposed at opposite ends of the roller portion, for controlling positions of the both edges of the tape, and a pair of bearings for rotatably supporting the roller portion on a shaft portion of a roller shaft. Each of the bearings has a bearing flange at one end thereof. The pair of disk-shaped annular flanges is made of a material firmer than that of the hollow cylindrical-shaped roller portion. The disk-shaped annular flanges are mounted on an outer peripheral surface of the hollow cylindrical-shaped roller portion at opposite ends thereof. The disk-shaped annular flanges are retained by the bearing flanges on press-fitting the pair of bearings in the hollow cylindrical-shaped roller portion.

In the above-mentioned recording and/or reproducing device, the outer peripheral surface of the hollow cylindrical-shaped roller portion preferably may have a pair of flange guides, at opposite ends thereof, for guiding the pair of disk-shaped annular flanges. Each of the flange guides may have a longitudinal length which is shorter than a thickness of the disk-shaped annular flange. A gap may be formed among an end surface of the hollow cylindrical-shaped roller portion, the disk-shaped annular flange, and the bearing. In this event, an adhesive agent desirably may be filled in the gap. The pair of disk-shaped annular flanges preferably may be, for example, made of a material selected from the group consisting of zirconia, ceramic, sapphire, emerald, diamond.

On describing the gist of a third aspect of this invention, it is possible to be understood that a method is of manufacturing a guide roller. According to the third aspect of this invention, the method comprises the steps of preparing a hollow cylindrical-shaped roller having a pair of flange guides at opposite ends of an outer peripheral surface thereof, of inserting, in the pair of flange guides, a pair of disk-shaped annular flanges having an inner diameter which is substantially equal to a diameter of the flange guide, and of press-fitting a pair of bearings each having a bearing flange in an inner peripheral surface of the roller portion to retain the pair of disk-shaped annular flanges by means of the bearing flanges.

In the above-mentioned method, each of the flange guides may have a longitudinal length which is shorter than a thickness of the disk-shaped annular flange. In this event, the method preferably further may comprise the step of, between the inserting step and the press-fitting, filling an adhesive agent in a gap formed among an end surface of the hollow cylindrical-shaped roller portion, the disk-shaped annular flange, and the bearing.

BRIEF DESCRIPTION OF THE DRAWINGS

FIG. 5 is an exploded perspective view of a second conventional guide roller;

FIG. 6 is an assembled perspective view of the guide roller illustrated in FIG. 5;

FIG. 7 is a cross-sectional view of the guide roller illustrated in FIG. 6;

FIG. 8 is an enlarged cross-sectional view of a part 8 encircled in FIG. 7.

FIG. 10 is an exploded perspective view of a guide roller according to an embodiment of this invention;

FIG. 11 is an assembled perspective view of the guide roller illustrated in FIG. 10;

FIG. 12 is a cross-sectional view of the guide roller illustrated in FIG. 11; and FIG. 13 is an enlarged cross-sectional view of a part 13 encircled in FIG. 12.

DESCRIPTION OF THE PREFERRED EMBODIMENT

Figure 1:
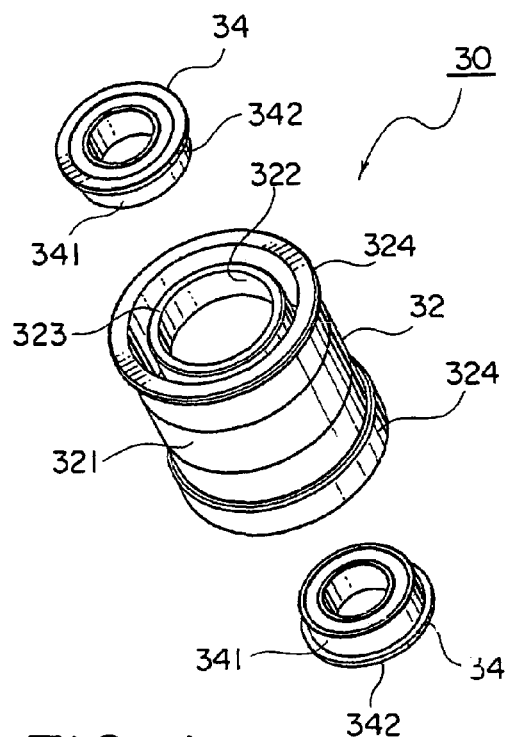
FIG. 1 is an exploded perspective view of a first conventional guide roller.
Figure 2:
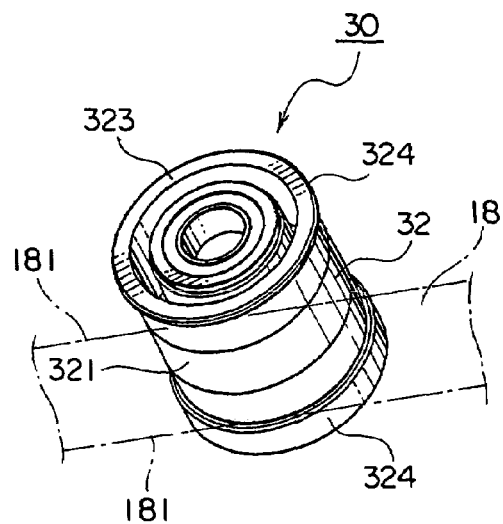
FIG. 2 is an assembled perspective view of the guide roller illustrated in FIG. 1.
Figure 3:
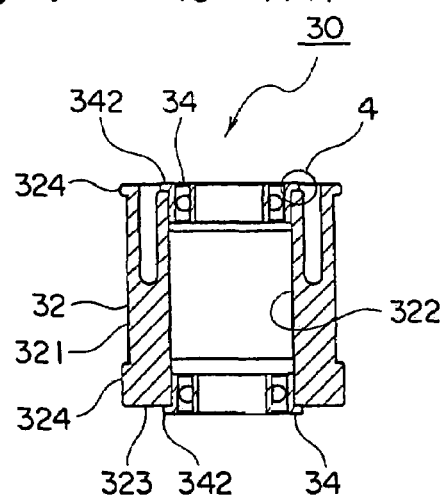
FIG. 3 is a cross-sectional view of the guide roller illustrated in FIG. 2.
Figure 4:
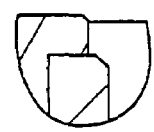
FIG. 4 is an enlarged cross-sectional view of a part 4 encircled in FIG. 3.

Referring to FIGS. 1 to 4, a first conventional guide roller 30 will be described at first in order to facilitate an understanding of the present invention. FIG. 1 is an exploded perspective view of the guide roller 30. FIG. 2 is an assembled perspective view of the guide roller 30. FIG. 3 is a cross-sectional view of the guide roller 30. FIG. 4 is an enlarged cross-sectional view of a part 4 encircled in FIG. 3.

The first conventional guide roller 30 is substantially equal to the guide roller disclosed in the above-mentioned United States Patent Application Publication No. 2004/0222327 A1. The guide roller 30 is for guiding a tape 18 having both edges 181 at opposite ends thereof, as shown in FIG. 2.

As shown in FIG. 1, the guide roller 30 comprises a substantially hollow cylindrical-shaped roller portion 32, and a pair of bearings 34 and 34.

The roller portion 32 has a roller outer peripheral surface 321, a roller inner peripheral surface 322, a pair of roller end surfaces 323, 323, and a pair of roller flanges 324 and 324. The pair of roller flanges 324, 324 radially projects from the roller outer peripheral surface 321 at opposite ends thereof outwardly. The roller outer peripheral surface 321 is for guiding traveling of the tape 18. The pair of roller flanges 324, 324 is for controlling positions of the both edges 181, 181 of the tape 18 in a case of traveling.

On the other hand, each bearing 34 has a bearing outer peripheral surface 341 and a bearing flange 342. The bearing flange 342 radially projects from the bearing peripheral surface 341 at one end thereof outwardly. The bearing outer peripheral surface 341 has a diameter which is slightly larger than that of the roller inner peripheral surface 322.

With the guide roller 30 having such a structure, as shown in FIGS. 3 and 4, the pair of bearings 34 is press-fitted and positioned in the roller inner peripheral surface 322 of the roller portion 32 so that the bearing outer peripheral surface 341 slidably comes into contact with the roller inner peripheral surface 322 and the bearing flange 342 comes into contact with the roller end surface 323.

In the guide roller 30 illustrated in FIGS. 1 to 4, the pair of roller flanges 324, 324 are integrally formed in the roller portion 32.

On the other hand, a different guide roller is disclosed in the above-mentioned JP-A H9-22067. In the different guide roller disclosed in JP-A H9-22067, a cylindrical-shaped roller portion and a pair of disk-shaped annular flanges are separately constituted and the pair of disk-shaped annular flanges is fitted in an outer surface of the cylindrical-shaped roller portion at opposite end sides. JP-A H9-22067 also discloses the guide roller in which each flange is made of material having hardness firmer than that of the roller portion.

Referring to FIGS. 5 to 8, a second conventional guide roller 40 will be described in order to facilitate an understanding of the present invention. FIG. 5 is an exploded perspective view of the guide roller 40. FIG. 6 is an assembled perspective view of the guide roller 40. FIG. 7 is a cross-sectional view of the guide roller 40. FIG. 8 is an enlarged cross-sectional view of a part 8 encircled in FIG. 7.

The second conventional guide roller 40 is substantially equal to the guide roller disclosed in the above-mentioned JP-A H9-22067. The guide roller 40 is for guiding the tape 18 having the both edges 181 at opposite ends thereof, as shown in FIG. 6.

As shown in FIG. 5, the guide roller 40 comprises a hollow cylindrical-shaped roller portion 42, a pair of bearings 44, 44, and a pair of disk-shaped annular flanges 46, 46. The roller portion 42 is for guiding traveling of the tape 18. The pair of flanges 46, 46 is for controlling positions of the both edges 181, 181 of the tape 18 in a case of traveling.

The hollow cylindrical-shaped roller portion 42 has a roller outer peripheral surface 421 and a roller inner peripheral surface 422. The roller outer peripheral surface 421 has both ends at which a pair of outer peripheral step parts 421a is formed. The roller inner peripheral surface 422 has both ends at which a pair of inner peripheral step parts 422a is formed. The outer peripheral step part 421a has a diameter which is slightly larger than an inner diameter of the flange 46.

On the other hand, each bearing 44 has a bearing outer peripheral surface 441 and a bearing flange 442. The bearing flange 442 radially projects from the bearing outer peripheral surface 441 at one end thereof outwardly. The bearing outer peripheral surface 441 has a diameter which is slightly larger than that of the roller inner peripheral surface 422.

With the guide roller 40 having such a structure, as shown in FIG. 7, the pair of bearings 44, 44 is press-fitted in the pair of inner peripheral step parts 422a at the both end sides of the roller inner peripheral surface 422 of the hollow cylindrical-shaped roller portion 42. On the other hand, as shown in FIGS. 7 and 8, the pair of disk-shaped annular flanges 46, 46 is fitted (or press-fitted) in the pair of outer peripheral step parts 421a at both ends of the roller outer peripheral surface 421 of the hollow cylindrical-shaped roller portion 42.

In addition, as shown in FIG. 8, the outer peripheral step part 421a has a longitudinal length L1 which is substantially equal to or longer than thickness W1 of the disk-shaped annular flange 46.

Incidentally, in the tape drive, as methods of realizing a large capacity, the following methods are adopted: to increase head channels, to lengthen the tape by thinning a thickness of the tape to be used, to increase a transport rate by becoming fast a tape traveling speed, or the like. However, to thin the thickness of the tape and to increase the tape traveling speed are disadvantageous in that edges of the tape mar the flanges of the guide roller. It results in adversely affect traveling of the tape.

In order to resolve such problems, it is carried out by coating, with a material having high hardness such as titanium, ceramics, DLC (diamond-like carbon), or the like, a surface of the roller portion 32 (a surface of the roller outer peripheral surface 321 and the roller flange 324) in the first conventional guide roller 30 illustrated in FIGS. 1 to 4 or a surface of the flanges 46 in the second conventional guide roller 40 illustrated in FIGS. 5 to 8. However, to apply the above-mentioned particular coating to the surface is disadvantageous in that the guide roller increases in cost.

Particularly, in a case where the roller flanges 324 are integrally formed in the roller portion 32 as the first conventional guide roller 30 illustrated in FIGS. 1 to 4, the particular coating further increases in cost because the coating is applied to all of the surface of the roller portion 32 (the surface of the roller outer peripheral surface 321 and the roller flange 324).

On the other hand, in order to resolve the above-mentioned problems, it may be considered that only the flanges 46 are made of a material firmer than that of the roller portion 42 in the second conventional guide roller 40 illustrated in FIGS. 5 to 8. However, another problem may be encountered in making the flanges 46 of the firm material. This is because the flanges 46 crack on press-fitting the pair of flanges 46, 46 in the pair of outer peripheral step parts 421a, 421a at the both ends of the roller outer peripheral surface 421 of the roller portion 42. In order to resolve the problem on press-fitting the flanges, is may be considered that it is designed so that the diameter of the outer peripheral step part 421a is substantially equal to the inner diameter of the flange 46 and the pair of flanges 46 is coupled by means of an adhesive agent with the outer peripheral step parts 421a at both sides of the roller outer peripheral surface 421 of the roller portion 42. However, with the structure of the guide roller 40 illustrated in FIGS. 5 to 8, it is disadvantageous in that the adhesive agent leaks on the roller outer peripheral surface 421 of the roller portion 42, as mentioned in the preamble in the instant specification.

Figure 9:
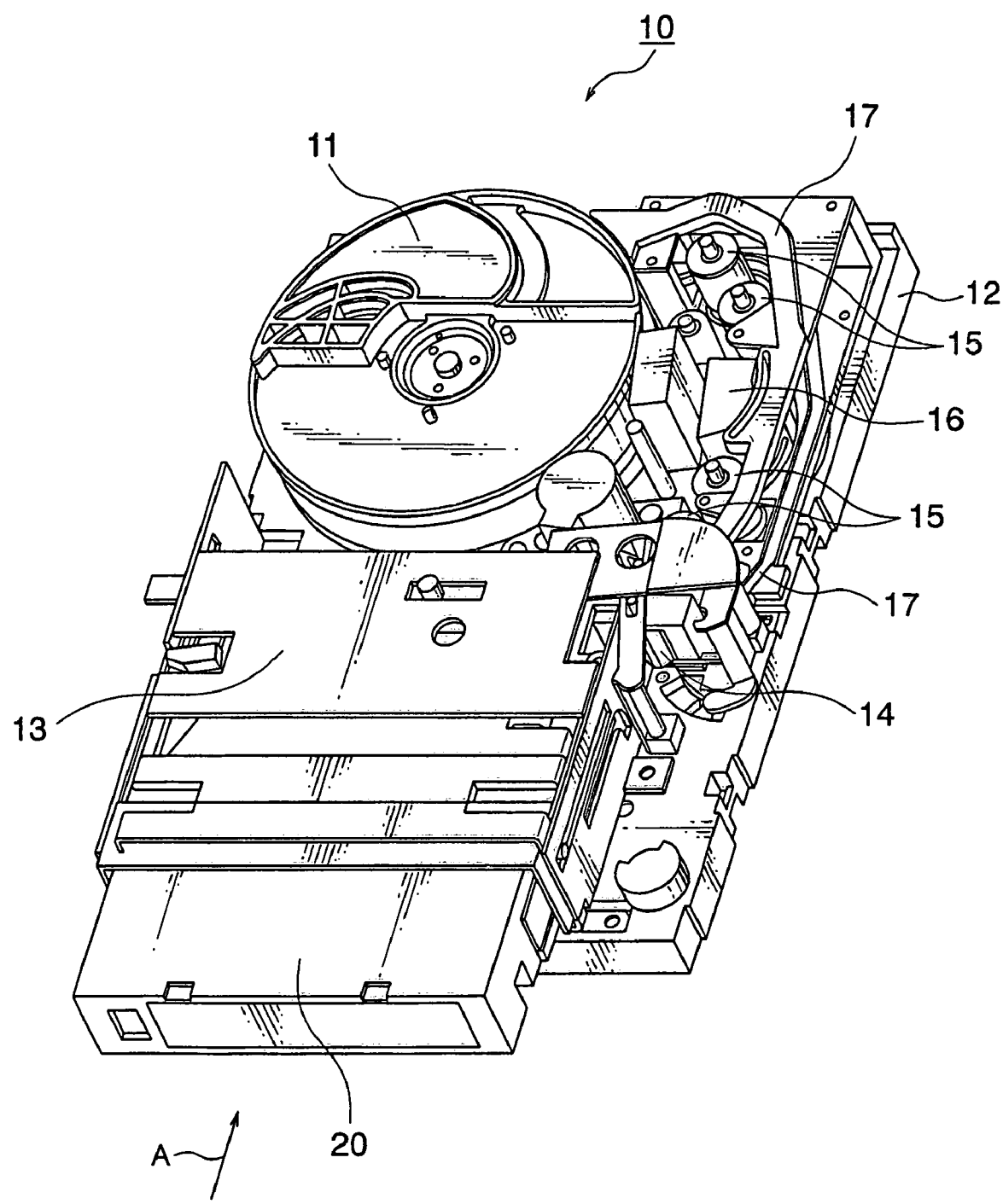
FIG. 9 is a perspective view showing a tape drive serving as a recording and/or reproducing device to which this invention is applicable with an upper cover removed therefrom.

Referring to FIG. 9, the description will proceed to a tape drive 10 serving as a recording and/or reproducing device to which this invention is applicable. FIG. 9 is a perspective view showing the tape drive 10 with an upper cover removed therefrom. The illustrated tape drive 10 shows an example of the LTO (linear tape open).

The tape drive 10 is for receiving a cartridge 20 and contains a take-up reel 11 inside thereof. The take-up reel 11 is also called a spool. The tape drive 10 is generally comprised of a rectangular housing (chassis) 12 that has a common base. The base has first and second spindle motors (reel motors) (not shown). The first spindle motor has the spool (or the take-up reel) 11 permanently mounted on the base of the housing 12 and the spool 11 is dimensioned to accept a relatively high speed streaming magnetic tape (which will later be described). The second spindle motor (reel motor) is adapted to accept the removable cartridge 20. The removable cartridge 20 is inserted into the tape drive 10 via a lift 13 formed on the housing 12 of the tape drive 10 along an insertion direction depicted at an arrow A.

Upon insertion of the cartridge 20 into the lift 13, the cartridge 20 engages the second spindle motor (the supply reel motor). Prior to rotation of the first and the second spindle motors (reel motors), the cartridge 20 is connected to the permanently mounted spool (the take-up reel) 11 by means of a connection between a grabber 14 and a leader pin (not shown). A number of guide rollers 15 positioned intermediate the cartridge 20 and the permanent spool 11 guide the magnetic tape as it traverses at relatively high speeds back and forth between the cartridge 20 and the permanently mounted spool 11. The plurality of guide rollers 15 are disposed in a state where they have height positions on the chassis 12 that very slightly deviate from one anther. The plurality of guide rollers 15 constitute a guide assembly.

The tape drive 10 further comprises a head actuator assembly 16. The head actuator 16 is located between the take-up spool 11 and the cartridge 20 on a tape-transport path (not shown) defined by the above-mentioned plurality of guide rollers 15. During operation, the magnetic tape flows forward and backward between the take-up spool 11 and the cartridge 20 and is closely adjacent to the head actuator 16 while the magnetic tape flows on the defined tape-transport path.

Referring to FIGS. 10 through 13, the description will proceed to a guide roller 50 according to an embodiment of this invention. The illustrated guide roller 50 is used as the guide roller 15 for use in the tape drive 10 illustrated in FIG. 9. The guide roller 50 (15) is rotatably supported on a roller shaft (not shown) mounted on the chassis 12 (FIG. 9). The roller shaft may be used one disclosed in the above-mentioned U.S. Pat. No. 6,634,535.

FIG. 10 is an exploded perspective view of the guide roller 50. FIG. 11 is an assembled perspective view of the guide roller 50. FIG. 12 is a cross-sectional view of the guide roller 50. FIG. 13 is an enlarged cross-sectional view of a part 13 encircled in FIG. 12.

The guide roller 50 is for guiding the tape 18 having the both edges 181, 181 at opposite ends of the tape 18, as shown in FIG. 11.

As shown in FIG. 10, the guide roller 50 comprises a hollow cylindrical-shaped roller portion 52, a pair of bearings 54, 54, and a pair of disk-shaped annular flanges 56, 56. The hollow cylindrical-shaped roller portion 52 is for guiding traveling of the tape 18. The pair of bearings 54, 54 is for rotatably supporting the hollow cylindrical-shaped roller portion 52 on a shaft portion (not shown) of the above-mentioned roller shaft as disclosed in the U.S. Pat. No. 6,634,535. The pair of disk-shaped annular flanges 56, 56 is for controlling positions of the both edges 181, 181 of the tape 18 on traveling of the tape 18.

The hollow cylindrical-shaped roller portion 52 has a roller outer peripheral surface 521 and a roller inner peripheral surface 522. The roller outer peripheral surface 521 has both ends at which a pair of outer peripheral step parts 521a, 521a is formed. Each outer peripheral step part 521a has a diameter which is substantially equal to an inner diameter of the flange 56. Inasmuch as the pair of outer peripheral step parts 521a, 521a is for guiding the flanges 56, 56, each outer peripheral step part 521a is also called a flange guide.

On the other hand, each bearing 54 has a bearing outer peripheral surface 541 and a bearing flange 542. The bearing flange 542 radially projects from the bearing outer peripheral surface 541 at one end thereof outwardly. The bearing outer peripheral surface 541 has a diameter which is slightly larger than that of the roller inner peripheral surface 522.

The flange 56 is made of material having hardness higher than that of the roller portion 52. In the example being illustrated, the material of the roller portion 52 is aluminum (Al) or stainless steel while the material of the flange 56 is zirconia or zirconium dioxide ($ZrO_2$). The material of the flange 56 is not restricted to the zirconia, the material of the flange 56 may have high hardness and head-to-scraping such as ceramic, sapphire, emerald, diamond, or the like. Inasmuch as material having high stiffness or rigidity is generally used as material of the bearing 54, the bearing 54 possesses adequate stiffness or rigidity in order to retain the flange. In the example being illustrated, the bearing 54 is made of stainless steel.

In addition, as shown in FIG. 13, the outer peripheral step part 521a has a longitudinal length L2 which is shorter than thickness W2 of the disk-shaped annular flange 56.

The guide roller 50 having such structure is manufactured as follows. At first, as shown in FIGS. 12 and 13, the pair of disk-shaped annular flanges 56, 56 is inserted (or lightly fitted) in the pair of outer peripheral step parts (flange guides) 521a, 521a, at both ends of the roller outer peripheral surface 521 of the hollow cylindrical-shaped roller portion 52, respectively. Thereafter, as shown in FIGS. 12 and 13, the pair of bearings 54, 54 is press-fitted in the roller inner peripheral surface 522 of the hollow cylindrical-shaped roller portion at both ends thereof. On press-fitting of the pair of bearings 54, 54, the flanges 56, 56 are retained by means of the bearing flanges 542, 542, as shown in FIG. 13.

In addition, as shown in FIG. 13, although a gap G of clearance is formed among an end surface of the hollow cylindrical-shaped roller portion 52, the disk-shaped annular flange 56, and the bearing 54, an adhesive agent may be inserted in the gap G. Inasmuch as the adhesive agent is inserted in the gap G, a conventional problem where the adhesive agent leaks out the outside does not arise With the guide roller 50 having such structure, the roller portion 52 is simple in shape compared with the shape of the roller portion 42 illustrated in FIGS. 5 to 8. As a result, it is possible to easily work the roller portion 52. Inasmuch as material having high hardness is only used to the flanges 56, it is possible to provide the guide roller 50 at low cost compared with a conventional case where coating is covered. In addition, inasmuch as the disk-shaped annular flange 56 is retained by the bearing flange 542, it is possible to reduce a parts count compared with a case where the flange is retained by a different part.

While this invention has thus far been described in conjunction with a preferred embodiment thereof, it is to be understood that modifications will be apparent to those skilled in the art without departing from the spirit of the invention. For example, although a case where the recording and/or reproducing device comprises the LTO (linear tape open) is exemplified in the above-mentioned embodiment, of cause, this invention certainly may be applicable to a guide roller for use in DLT (digital linear tape).

What is claimed is:

1. A guide roller for guiding a tape having both edges at opposite ends thereof, said guide roller comprising a hollow cylindrical-shaped roller portion for guiding traveling of said tape, a pair of disk-shaped annular flanges, disposed at opposite ends of said roller portion, for controlling positions of the both edges of said tape, and a pair of bearings for rotatably supporting said roller portion, wherein each of said bearings has a bearing flange at one end thereof, said pair of disk-shaped annular flanges being made of material firmer than that of said hollow cylindrical-shaped roller portion, said disk-shaped annular flanges being mounted on an outer peripheral surface of said hollow cylindrical-shaped roller portion at opposite ends thereof, said disk-shaped annular flanges being retained by said bearing flanges on press-fitting said pair of bearings in said hollow cylindrical-shaped roller portion.

2. The guide roller as claimed in claim 1, wherein the outer peripheral surface of said hollow cylindrical-shaped roller portion has a pair of flange guides, at opposite ends thereof, for guiding the pair of disk-shaped annular flanges, each of said flange guides having a longitudinal length which is shorter than a thickness of said disk-shaped annular flange.

3. The guide roller as claimed in claim 2, wherein a gap is formed among an end surface of said hollow cylindrical-shaped roller portion, said disk-shaped annular flange, and said bearing, an adhesive agent is filled in said gap.

4. The guide roller as claimed in claim 1, wherein said pair of disk-shaped annular flanges is made of a material selected from the group consisting of zirconia, ceramic, sapphire, emerald, diamond.

5. A recording and/or reproducing device including a guide assembly comprising a plurality of guide rollers each of which guides a tape having both edges at opposite ends thereof, wherein each of said guide rollers comprises:

a hollow cylindrical-shaped roller portion for guiding traveling of said tape;

a pair of disk-shaped annular flanges, disposed at opposite ends of said roller portion, for controlling positions of the both edges of said tape; and a pair of bearings for rotatably supporting said roller portion on a shaft portion of a roller shaft, wherein each of said bearings has a bearing flange at one end thereof, said pair of disk-shaped annular flanges being made of material firmer than that of said hollow cylindrical-shaped roller portion, said disk-shaped annular flanges being mounted on an outer peripheral surface of said hollow cylindrical-shaped roller portion at opposite ends thereof, said disk-shaped annular flanges being retained by said bearing flanges on press-fitting said pair of bearings in said hollow cylindrical-shaped roller portion.

6. The recording and/or reproducing device as claimed in claim 5, wherein the outer peripheral surface of said hollow cylindrical-shaped roller portion has a pair of flange guides, at opposite ends thereof, for guiding the pair of disk-shaped annular flanges, each of said flange guides having a longitudinal length which is shorter than a thickness of said disk-shaped annular flange.

7. The recording and/or reproducing device as claimed in claim 6, wherein a gap is formed among an end surface of said hollow cylindrical-shaped roller portion, said disk-shaped annular flange, and said bearing, an adhesive agent is filled in said gap.

8. The recoding and/or reproducing device as claimed in claim 5, wherein said pair of disk-shaped annular flanges is made of a material selected from the group consisting of zirconia, ceramic, sapphire, emerald, diamond.

9. A method of manufacturing a guide roller, comprising the steps of:

preparing a hollow cylindrical-shaped roller having a pair of flange guides at opposite ends of an outer peripheral surface thereof;

inserting, in the pair of flange guides, a pair of disk-shaped annular flanges having an inner diameter which is substantially equal to a diameter of said flange guide; and press-fitting a pair of bearings each having a bearing flange in an inner peripheral surface of said roller portion to retain said pair of disk-shaped annular flanges by means of said bearing flanges.

10. The method as claimed in claim 9, each of said flange guides having a longitudinal length which is shorter than a thickness of said disk-shaped annular flange, wherein said method further comprises the step of, between said inserting step and said press-fitting, filling an adhesive agent in a gap formed among an end surface of said hollow cylindrical-shaped roller portion, said disk-shaped annular flange, and said bearing.

* * * * *